US006578142B1

(12) United States Patent
Anderson et al.

(10) Patent No.: US 6,578,142 B1
(45) Date of Patent: *Jun. 10, 2003

(54) METHOD AND APPARATUS FOR AUTOMATICALLY INSTALLING AND CONFIGURING SOFTWARE ON A COMPUTER

(75) Inventors: Eric C. Anderson, Sunnyvale, CA (US); David Pitard, Santa Clara, CA (US)

(73) Assignee: Phoenix Technologies, Ltd., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/336,289

(22) Filed: Jun. 18, 1999

(51) Int. Cl.[7] ................................................ G06F 9/00
(52) U.S. Cl. ............................................ 713/2; 717/11
(58) Field of Search ................................ 713/1, 2, 100; 717/11

(56) References Cited

U.S. PATENT DOCUMENTS

| 5,121,345 | A | 6/1992 | Lentz |
| 5,128,995 | A | 7/1992 | Arnold et al. |
| 5,131,089 | A | 7/1992 | Cole |
| 5,142,680 | A | 8/1992 | Ottman et al. |
| 5,146,568 | A | 9/1992 | Flaherty et al. |
| 5,214,695 | A | 5/1993 | Arnold et al. |
| 5,274,816 | A | 12/1993 | Oka |
| 5,280,627 | A | 1/1994 | Flaherty et al. |
| 5,307,497 | A | 4/1994 | Feigenbaum et al. |
| 5,325,532 | A | 6/1994 | Crosswy et al. |
| 5,379,431 | A | 1/1995 | Lemon et al. |
| 5,381,549 | A | 1/1995 | Tamura |
| 5,418,918 | A | 5/1995 | Vander Kamp et al. |
| 5,444,850 | A | 8/1995 | Chang |
| 5,448,741 | A | 9/1995 | Oka |
| 5,452,454 | A | 9/1995 | Basu |
| 5,463,766 | A | 10/1995 | Schieve et al. |
| 5,469,573 | A | 11/1995 | McGill, III et al. |
| 5,504,905 | A | 4/1996 | Cleary et al. |
| 5,522,076 | A | 5/1996 | Dewa et al. |
| 5,526,523 | A | 6/1996 | Straub et al. |
| 5,542,082 | A | 7/1996 | Solhjell |
| 5,581,740 | A | 12/1996 | Jones |
| 5,586,327 | A | 12/1996 | Bealkowski et al. |
| 5,594,903 | A | 1/1997 | Bunnell et al. |
| 5,604,890 | A | 2/1997 | Miller |
| 5,652,868 | A | 7/1997 | Williams |
| 5,652,886 | A | 7/1997 | Tulpule et al. |
| 5,664,194 | A | 9/1997 | Paulsen |
| 5,680,547 | A | 10/1997 | Chang |
| 5,692,190 | A | 11/1997 | Williams |
| 5,694,583 | A | 12/1997 | Williams et al. |
| 5,694,600 | A | 12/1997 | Khenson et al. |
| 5,701,477 | A | 12/1997 | Chejlava, Jr. |
| 5,715,456 | A | 2/1998 | Bennett et al. |
| 5,717,930 | A | 2/1998 | Imai et al. |
| 5,727,213 | A | 3/1998 | Vander Kamp et al. |
| 5,732,268 | A | 3/1998 | Bizzarri |
| 5,748,957 | A | 5/1998 | Klein |
| 5,754,853 | A | 5/1998 | Pearce |

(List continued on next page.)

Primary Examiner—Dennis M. Butler

(57) ABSTRACT

A method including copying a first application from a first non-volatile memory to a second non-volatile memory and setting the first application to be a start-up application. The method further includes booting-up an operating system and executing the first application. The method also includes determining if a suitable connection exists, determining if a needed bandwidth of the suitable connection is available, and downloading a second application if the suitable connection exists and the needed bandwidth of the suitable connection is available. The method then includes executing the second application. An apparatus for performing the method is also disclosed.

33 Claims, 8 Drawing Sheets

U.S. PATENT DOCUMENTS

| | | |
|---|---|---|
| 5,764,593 A | 6/1998 | Turpin et al. |
| 5,781,758 A | 7/1998 | Morley |
| 5,790,849 A | 8/1998 | Crocker et al. |
| 5,796,984 A | 8/1998 | Pearce et al. |
| 5,802,363 A | 9/1998 | Williams et al. |
| 5,805,880 A | 9/1998 | Pearce et al. |
| 5,805,882 A | 9/1998 | Cooper et al. |
| 5,815,706 A | 9/1998 | Stewart et al. |
| 5,819,063 A | 10/1998 | Dahl et al. |
| 5,828,888 A | 10/1998 | Kazaki et al. |
| 5,832,251 A | 11/1998 | Takahashi |
| 5,842,011 A | 11/1998 | Basu |
| 5,845,077 A * | 12/1998 | Fawcett ...................... 709/221 |
| 5,854,905 A | 12/1998 | Garney |
| 5,864,698 A | 1/1999 | Krau et al. |
| 5,870,610 A * | 2/1999 | Beyda ........................ 395/712 |
| 5,887,164 A | 3/1999 | Gupta |
| 5,901,310 A | 5/1999 | Rahman et al. |
| 5,907,679 A | 5/1999 | Haong et al. |
| 6,009,274 A * | 12/1999 | Fletcher et al. ............. 395/712 |
| 6,282,712 B1 * | 8/2001 | Davis et al. ................... 717/11 |
| 6,405,309 B1 * | 6/2002 | Cheng et al. ................... 713/1 |
| 2001/0042112 A1 * | 11/2001 | Slivka et al. ............... 709/220 |

\* cited by examiner

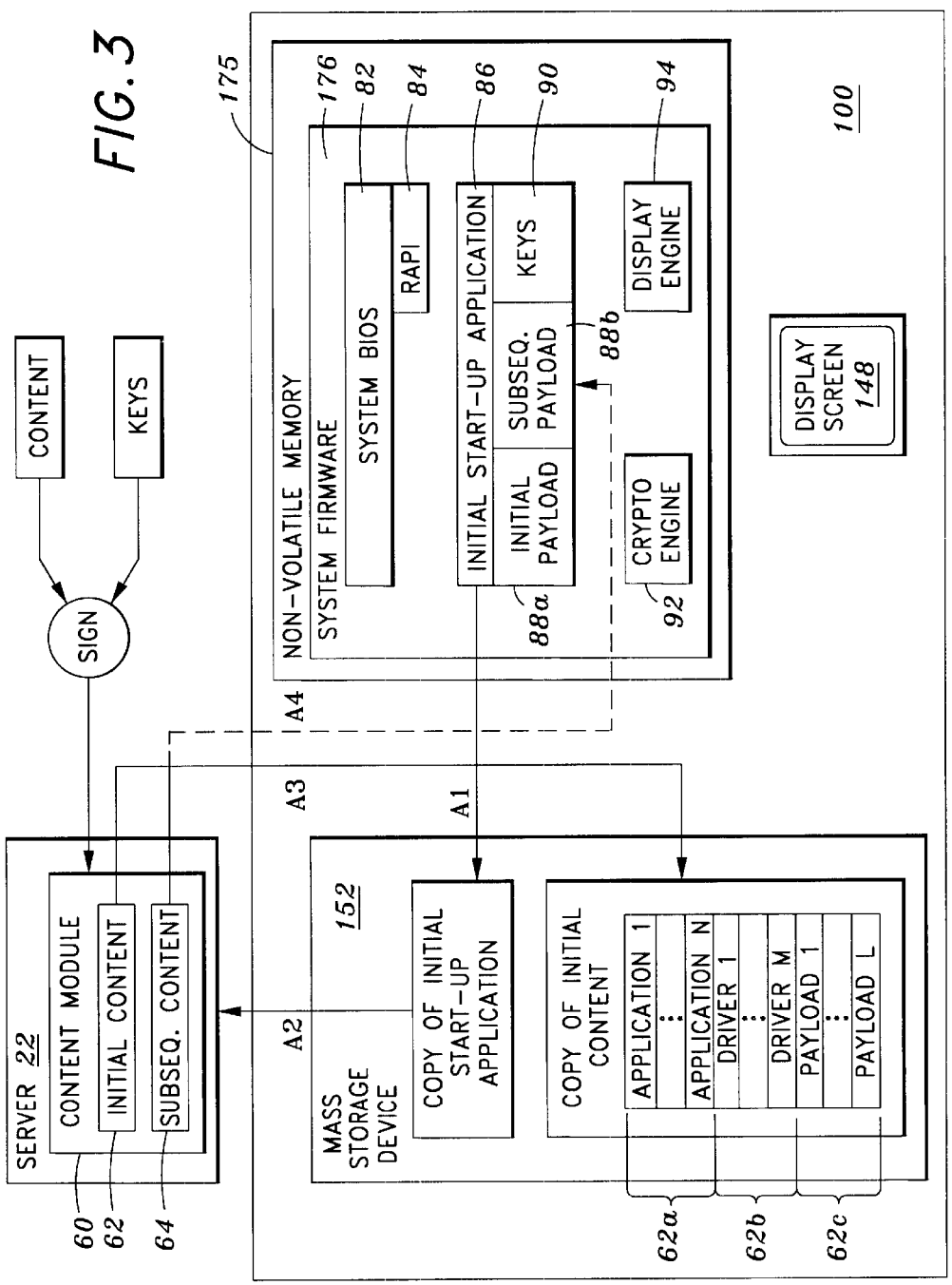

METHOD AND APPARATUS FOR AUTOMATICALLY INSTALLING AND CONFIGURING SOFTWARE ON A COMPUTER

FIELD OF THE INVENTION

This invention relates to the automatic configuration of a computer. Specifically, this invention describes a method and apparatus for automatically installing and configuring software on a computer.

DESCRIPTION OF RELATED ART

The increasing use of computers in collecting and distributing information has revealed various problems with the typical collection and distribution channels. For example, one current software distribution system enables the software vendor to provide a number of users with software over a network. The system also enables the vendor to update and maintain the software at the request of the users and to enable the users to acquire software at the users' requests from different software vendors over the network. However, such a system only provides software and related services at the request of the user, without considering the user's requirements or preferences. As a result, the system is not optimized for the user's specific needs and/or preferences.

Normally, computer systems are shipped to users without any bundled software. When computer manufacturers want to add software packages to increase a system's perceived end-user value, increased configuration time and expense is created as each additional software package must be installed and tested during the assembly process of the system. To save time, a manufacturer might pre-configure such components of a system such as the hard disk drive. However, the manufacturer must be concerned with inventory costs and wasted configuration time if a change is necessary in the installed software.

One type of software that may be bundled with the system may be software for presenting information of interest to the user. This information of interest to the user is currently provided to the user in the form of advertisements displayed on the computer monitor after the operating system has been booted up and is operational. Such information or advertisements are typically provided to the user arbitrarily post boot or displayed on the monitor when the system is idle. Thus, during the boot process, no such information or advertisements are displayed to the user.

Accordingly, there is a need in the technology for a method and apparatus for automatically installing and configuring software on a computer that may allow information to be displayed during the boot process in addition to other times.

SUMMARY OF THE INVENTION

The invention describes a method including copying a first application from a first non-volatile memory to a second non-volatile memory and setting the first application to be a start-up application. The method further includes booting-up an operating system and executing the first application. The method also includes determining if a suitable connection exists, determining if a needed bandwidth of the suitable connection is available, and downloading a second application if the suitable connection exists and the needed bandwidth of the suitable connection is available. The method then includes executing the second application. An apparatus for performing the method is also described.

BRIEF DESCRIPTION OF THE DRAWINGS

FIG. 3 illustrates a block diagram detailing portions of one embodiment of the information distribution system of FIG. 1.

DETAILED DESCRIPTION

Definitions

Figure 1:
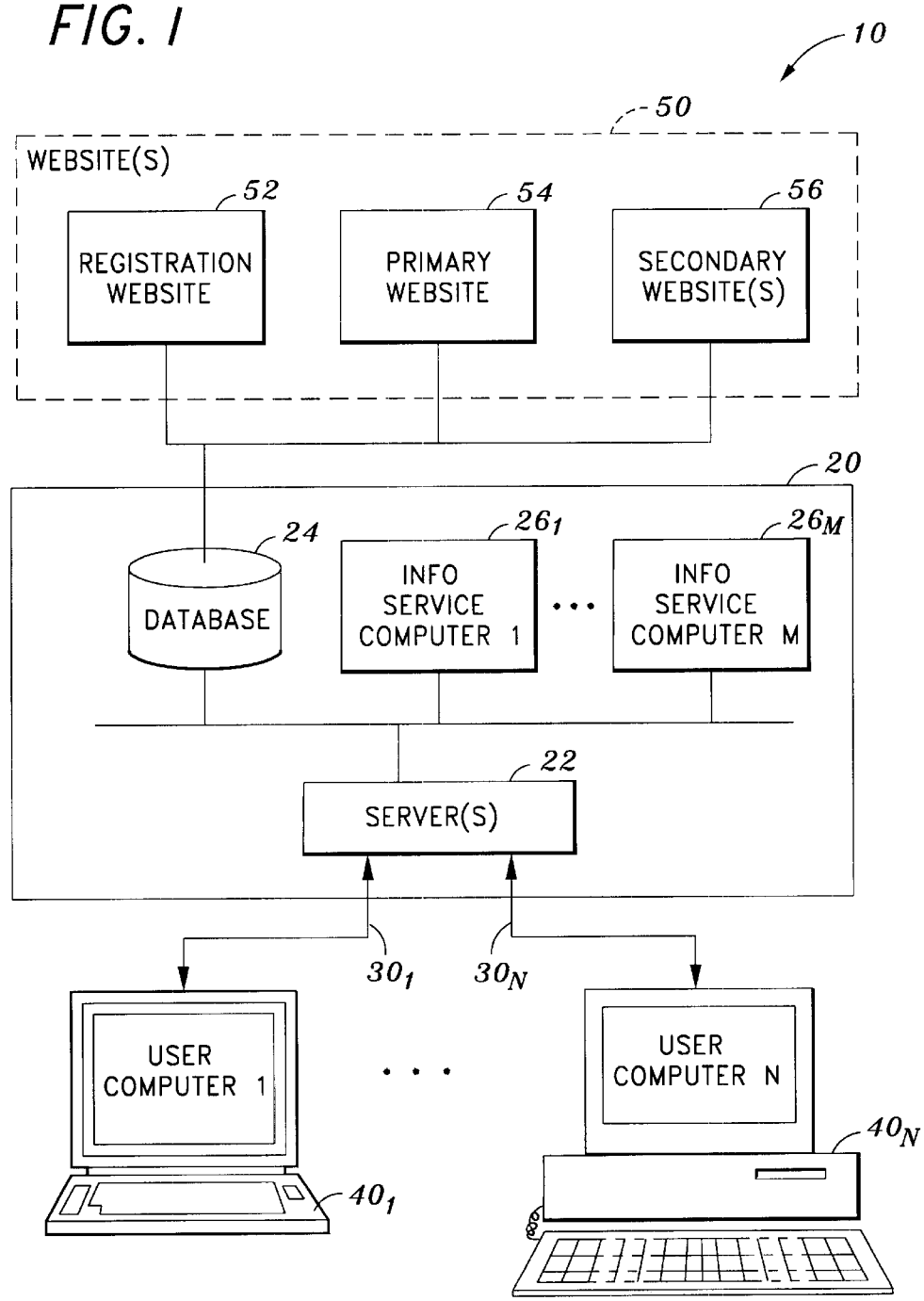
FIG. 1 is a system block diagram of one embodiment of an information distribution system in which the apparatus and method of the invention is used.

As discussed herein, a "computer system" is a product including circuitry capable of processing data. The computer system may include, but is not limited to, general purpose computer systems (e.g., server, laptop, desktop, palmtop, personal electronic devices, etc.), personal computers (PCs), hard copy equipment (e.g., printer, plotter, fax machine, etc.), banking equipment (e.g., an automated teller machine), and the like. An infomediary is a web site that provides information on behalf of producers of goods and services, supplying relevant information to businesses about products and/or services offered by suppliers and other businesses. Content refers to application programs, driver programs, utility programs, the payload, etc., and combinations thereof, as well as graphics, informational material (articles, stock quotes, etc.) and the like, either singly or in any combination. "Payload" refers to messages with graphics or informational material (such as articles, stock quotes, etc.) and may include files or applications. In one embodiment, it is transferred at a predetermined time to the system's mass storage media. In addition, a "communication link" refers to the medium or channel of communication. The communication link may include, but is not limited to, a telephone line, a modem connection, an Internet connection, an Integrated Services Digital Network ("ISDN") connection, an Asynchronous Transfer Mode (ATM) connection, a frame relay connection, an Ethernet connection, a coaxial connection, a fiber optic connection, satellite connections (e.g. Digital Satellite Services, etc.), wireless connections, radio frequency (RF) links, electromagnetic links, two way paging connections, etc., and combinations thereof.

In addition, the loading of an operating system ("OS") refers to the initial placement of the operating system bootstrap loader. In one embodiment, during the OS load, a sector of information is typically loaded from a hard disk into the system memory. Alternatively, the bootstrap loader is loaded from a network into system memory. An OS "boot" refers to the execution of the bootstrap loader. This places the OS in control of the system. Some of the actions performed during the OS boot include system configuration, device detection, loading of drivers and user logins.

OS runtime refers to the completion of the boot phase and the beginning of the execution of applications by the OS. In one embodiment, during OS runtime, the OS interacts with the user to execute and/or run applications.

Power On Self Test (POST) refers to the instructions that are executed to configure and test the system hardware prior to loading an OS.

System Overview

A description of an exemplary system, which incorporates embodiments of the present invention, is hereinafter described.

The present invention relates to a method and apparatus for automatically installing and configuring software on a computer. It involves transferring an executable image (e.g., application) from the basic input output system (BIOS) of the system onto the hard disk or other mass media storage device of the system. The application, or an obtained replacement of the application, is executed every time the operating system starts, without user intervention. The transferred image is referred to in this document as the Internet Start-Up Application (ISUA). The application facilitates the construction and maintenance of a secure and private repository of Internet user and system profiles, collected primarily from warranty service registrations, Internet service registrations, system profiles, and user preferences. Initially, this information is used to register the user with the manufacturers of purchased hardware and software products, and with the providers of on-line or other services. Over time, the user data is used to create a user profile and notify users of relevant software updates and upgrades, to encourage on-line purchases of related products, and to enable one-to-one customized marketing and other services.

In one embodiment, two software modules are used to implement various embodiments of the invention. One is resident on a user's system, and is used to access a predetermined web site. For example, in one embodiment, the operating system and Basic Input and Output System (BIOS) are pre-installed on a computer system, and when the computer system is subsequently first powered up, an application, referred to for discussion purposes as the first software module (in one embodiment, the first software module is the initial start-up application (ISUA), that will be described in the following sections), will allow the launching of one or more executable programs in the pre-boot environment. In one embodiment, the first software module facilitates the launching of one or more executable programs prior to the loading, booting, execution and/or running of the OS. In one embodiment, the user is encouraged to select the use of such a program (i.e., the use of the first software module), and in alternative embodiments, the program is automatically launched. The program(s) contained in the first software module enables tools and utilities to run at an appropriate time, and with proper user authorization, also allow the user to download a second software module that includes drivers, applications and additional payloads through the Internet connection on the PC. The programs may also provide for remote management of the system if the OS fails to launch successfully.

Once the second software module has been delivered, it may become memory resident, and may disable the transferred copy of the first software module. The original copy of the first software module still residing in the system's non-volatile memory remains idle until the second software module fails to function, becomes corrupted or is deleted, upon which a copy of the original first software module is again transferred as described above. The second software module may include an application that connects the user to a specific server on the Internet and directs the user to a predetermined web site to seek authorization to down load further subscription material. The second software module may also include content that is the same or similar to the content of the first software module.

In one embodiment, the system may also include an initial payload that is stored in Read Only Memory BIOS (ROM BIOS). In one embodiment, the initial payload is part of the first software module (e.g., the ISUA). In an alternative embodiment, the initial payload is stored as a module in ROM BIOS, separate from the first software module. In one embodiment, the initial payload is launched from ROM BIOS and displayed on the screen after the Power On Self Test (POST) but prior to the booting, loading and/or execution of the OS. This may occur at a predetermined time, such as when the system is being manufactured, assembled and tested, or when the end user first activates the system. In an alternate embodiment, this initial payload is copied to a predetermined location (such as the system's hard disk) at a predetermined time, such as when the system is being manufactured, assembled and tested, or when the end user first activates the system. Once copied, the payload executes after POST but prior to operation of the OS, and may display graphics, advertisements, animation, Joint Photographic Experts Group (JPEG)/Moving Picture Experts Group (MPEG) formatted material on the screen. When additional programs and/or payloads are delivered (via the Internet or other outside connection), the display screen may be used to provide customized screens in the form of messages or graphics prior to and during booting of the OS. In addition, executable programs delivered in the first software module, as well as subsequent programs (such as the second software module) downloaded from the web site, may be used to survey the PC to determine various types of devices, drivers, and applications installed. In one embodiment, as described in the present application, entitled "Method and Apparatus for Automatically Installing And Configuring Software on a Computer," the first software module is used to identify and to automatically create shortcuts and/or bookmarks for the user. The programs downloaded from the website may include software that collects and maintains a user profile based on the user's preferences. Such information may be provided to the infomediary, which subsequently forwards portions of the information and/or compiled data based on the information to suppliers and other businesses to obtain updates or revisions of information provided by the suppliers and other businesses.

Referring to FIG. 1, the information distribution system 10 comprises a service center 20 that is connected over one or more communications links $30_1$–$30_N$ to one or more user computer systems $40_1$–$40_N$ ("40"). The service center 20 includes one or more servers 22, one or more databases 24, and one or more computers $26_1$–$26_M$. The one or more computers $26_1$–$26_M$ are capable of simultaneous access by a plurality of the user computer systems $40_1$–$40_N$. If a plurality of computers is used, then the computers $26_1$–$26_M$ may be connected by a local area network (LAN) or any other similar connection technology. However, it is also possible for the service center 20 to have other configurations. For example, a smaller number of larger computers (i.e. a few mainframe, mini, etc. computers) with a number of internal programs or processes running on the larger computers capable of establishing communications links to the user computers.

The service center 20 may also be connected to a remote network 50 (e.g., the Internet) or a remote site (e.g., a satellite, which is not shown in FIG. 1). The remote network 50 or remote site allows the service center 20 to provide a wider variety of computer software, content, etc. that could be stored at the service center 20. The one or more databases 24 connected to the service center computer(s), e.g., computer $26_1$, are used to store database entries consisting of computer software available on the computer(s) 26. In one embodiment, each user computer $40_1$–$40_N$ has its own secure database (not shown), that is not accessible by any other computer. The communication links $30_1$–$30_N$ allow the one or more user computer systems $40_1$–$40_N$ to simultaneously connect to the computer(s) $26_1$–$26_M$. The connections are managed by the server 22.

After a user computer system 40 establishes two-way communications with the information service computer 26, the content is sent to the user computer system 40 in a manner hereinafter described. The downloaded content includes an application that surveys the user, and/or the user computer system's hardware and/or software to develop a user profile as well as a profile of the user's system. The information gathered from the user and/or user's computer system is subsequently provided to the service center 20, which provides additional content to the user computer 40 based on the user and system profile. The database entries from the database connected to the service computer 26 contain information about computer software, hardware, and third party services and products that are available to a user. Based on the user and/or system profile, the content is further sent to the user computer for display. The content may also include a summary of information such as the availability of patches and fixes for existing computer software, new versions of existing computer software, brand new computer software, new help files, etc. The content may further include information regarding availability of hardware and third party products and services that is of interest to the user. The user is then able to make one or more choices from the summary of available products and services, and request that the products be transferred from the service computer 26 to the user computer. Alternatively, the user may purchase the desired product or service from the summary of available products and services.

Figure 2:
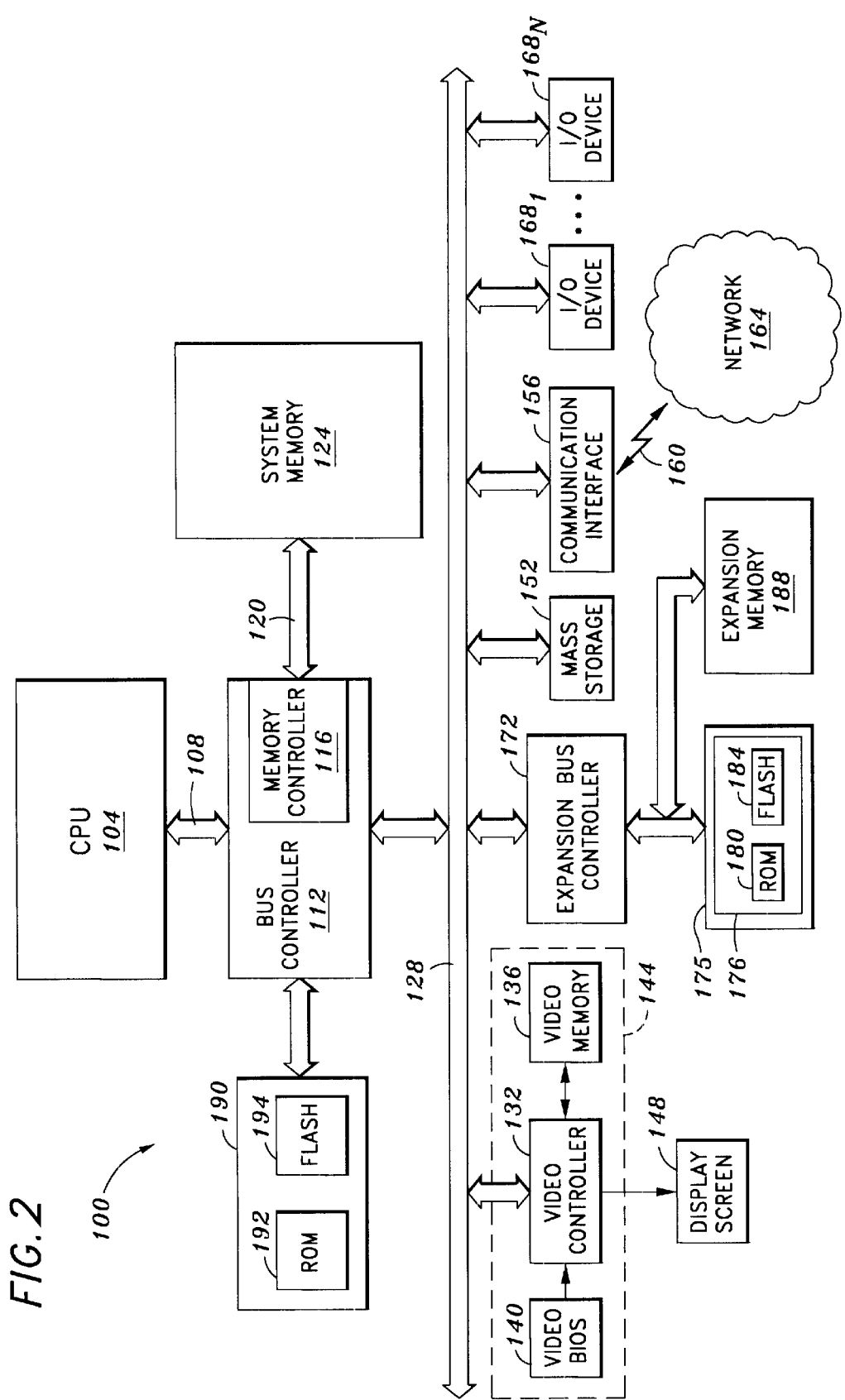
FIG. 2 illustrates an exemplary processor system or user computer system that may implement embodiments of the present invention.

FIG. 2 illustrates an exemplary computer system 100 that implements embodiments of the present invention. The computer system 100 illustrates one embodiment of user computer systems $40_1$–$40_N$ and/or computers $26_1$–$26_M$ (FIG. 1), although other embodiments may be readily used.

Referring to FIG. 2, the computer system 100 comprises a processor or a central processing unit (CPU) 104. The illustrated CPU 104 includes an Arithmetic Logic Unit (ALU) for performing computations, a collection of registers for temporary storage of data and instructions, and a control unit for controlling operation for the system 100. In one embodiment, the CPU 104 includes any one of the x86, Pentium™, Pentium II™, and Pentium Pro™ microprocessors as marketed by Intel™ Corporation, the K-6 microprocessor as marketed by AMD™, or the 6x86MX microprocessor as marketed by Cyrix™ Corp. Further examples include the Alpha™ processor as marketed by Digital Equipment Corporation™, the 680X0 processor as marketed by Motorola™; or the Power PC processor as marketed by IBM™. In addition, any of a variety of other processors, including those from Sun Microsystems, MIPS, IBM, Motorola, NEC, Cyrix, AMD, Nexgen and others may be used for implementing CPU 104. The CPU 104 is not limited to microprocessor but may take on other forms such as microcontrollers, digital signal processors, reduced instruction set computers (RISC), application specific integrated circuits, and the like. Although shown with one CPU 104, computer system 100 may alternatively include multiple processing units.

The CPU 104 is coupled to a bus controller 112 by way of a CPU bus 108. The bus controller 112 includes a memory controller 116 integrated therein, though the memory controller 116 may be external to the bus controller 112. The memory controller 116 provides an interface for access by the CPU 104 or other devices to system memory 124 via memory bus 120. In one embodiment, the system memory 124 includes synchronous dynamic random access memory (SDRAM). System memory 124 may optionally include any additional or alternative high speed memory device or memory circuitry. The bus controller 112 is coupled to a system bus 128 that may be a peripheral component interconnect (PCI) bus, Industry Standard Architecture (ISA) bus, etc. Coupled to the system bus 128 are a graphics controller, a graphics engine or a video controller 132, a mass storage device 152, a communication interface device 156, one or more input/output (I/O) devices $168_1$–$168_N$, and an expansion bus controller 172. The video controller 132 is coupled to a video memory 136 (e.g., 8 Megabytes) and video BIOS 140, all of which may be integrated onto a single card or device, as designated by numeral 144. The video memory 136 is used to contain display data for displaying information on the display screen 148, and the video BIOS 140 includes code and video services for controlling the video controller 132. In another embodiment, the video controller 132 is coupled to the CPU 104 through an Advanced Graphics Port (AGP) bus.

The mass storage device 152 includes (but is not limited to) a hard disk, floppy disk, CD-ROM, DVD-ROM, tape, high density floppy, high capacity removable media, low capacity removable media, solid state memory device, etc., and combinations thereof. The mass storage device 152 may include any other mass storage medium. The communication interface device 156 includes a network card, a modem interface, etc. for accessing network 164 via communications link 160. The I/O devices $168_1$–$168_N$ include a keyboard, mouse, audio/sound card, printer, and the like. The I/O device $168_1$–$168_N$ may be a disk drive, such as a compact disk drive, a digital disk drive, a tape drive, a zip drive, a jazz drive a digital video disk (DVD) drive, a solid state memory device, a magneto-optical disk drive, a high density floppy drive, a high capacity removable drive, a low capacity media device, and/or any combination thereof. The expansion bus controller 172 is coupled to nonvolatile memory 175 which includes system firmware 176. The system firmware 176 includes system BIOS 82, which is for controlling, among other things, hardware devices in the computer system 100. The system firmware 176 also includes ROM 180 and flash (or EEPROM) 184. The expansion bus controller 172 is also coupled to expansion memory 188 having RAM, ROM, and/or flash memory (not shown). The system 100 may additionally include a memory module 190 that is coupled to the bus controller 112. In one embodiment, the memory module 190 comprises a ROM 192 and flash (or EEPROM) 194.

As is familiar to those skilled in the art, the computer system 100 further includes an operating system (OS) and at least one application program, which in one embodiment, are loaded into system memory 124 from mass storage device 152 and launched after POST. The OS may include any type of OS including, but not limited or restricted to, DOS, Windows™ (e.g., Windows 95™, Windows 98™, Windows NT™), Unix, Linux, OS/2, OS/9, Xenix, etc. The operating system is a set of one or more programs which control the computer system's operation and the allocation of resources. The application program is a set of one or more software programs that performs a task desired by the user.

In accordance with the practices of persons skilled in the art of computer programming, the present invention is described below with reference to symbolic representations of operations that are performed by computer system 100, unless indicated otherwise. Such operations are sometimes referred to as being computer-executed. It will be appreciated that operations that are symbolically represented include the manipulation by CPU 104 of electrical signals representing data bits and the maintenance of data bits at memory locations in system memory 124, as well as other processing of signals. The memory locations where data bits are maintained are physical locations that have particular electrical, magnetic, optical, or organic properties corresponding to the data bits.

When implemented in software, the elements of the present invention are essentially the code segments to perform the necessary tasks. The program or code segments can be stored in a processor readable medium or transmitted by a computer data signal embodied in a carrier wave over a transmission medium or communication link. The "processor readable medium" may include any medium that can store or transfer information. Examples of the processor readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

FIG. 3 illustrates a logical diagram of computer system 100. Referring to FIGS. 2 and 3, the system firmware 176 includes software modules and data that are loaded into system memory 124 during POST and subsequently executed by the processor 104. In one embodiment, the system firmware 176 includes a system BIOS module 82 having system BIOS handlers, hardware routines, etc., a ROM application program interface (RAPI) module 84, an initial start-up application (ISUA) module 86, an initial payload 88*a*, cryptographic keys 90, a cryptographic engine 92, and a display engine 94. The aforementioned modules and portions of system firmware 176 may be contained in ROM 180 and/or flash 184. Alternatively, the aforementioned modules and portions of system firmware 176 may be contained in ROM 190 and/or flash 194. The RAPI 84, ISUA 86, and initial payload 88*a* may each be separately developed and stored in the system firmware 176 prior to initial use of the computer system 100. In one embodiment, the RAPI 84, ISUA 86, and initial payload 88*a* each includes proprietary software developed by Phoenix Technologies, Ltd. RAPI 84 provides a secure interface between ROM application programs and system firmware 176. One embodiment of RAPI 84 is described in co-pending U.S. patent application Ser. No. 09/336,889 entitled "System and Method for Securely Utilizing Basic Input and Output System (BIOS) Services," filed on Jun. 18, 1999, now U.S. Pat. No. 6,148,387, assigned to Phoenix Technologies, Ltd., and which is incorporated herein by reference. One embodiment of ISUA 86 is described in the present application entitled "Method and Apparatus for Automatically Installing and Configuring Software on a Computer."

Figure 4A:
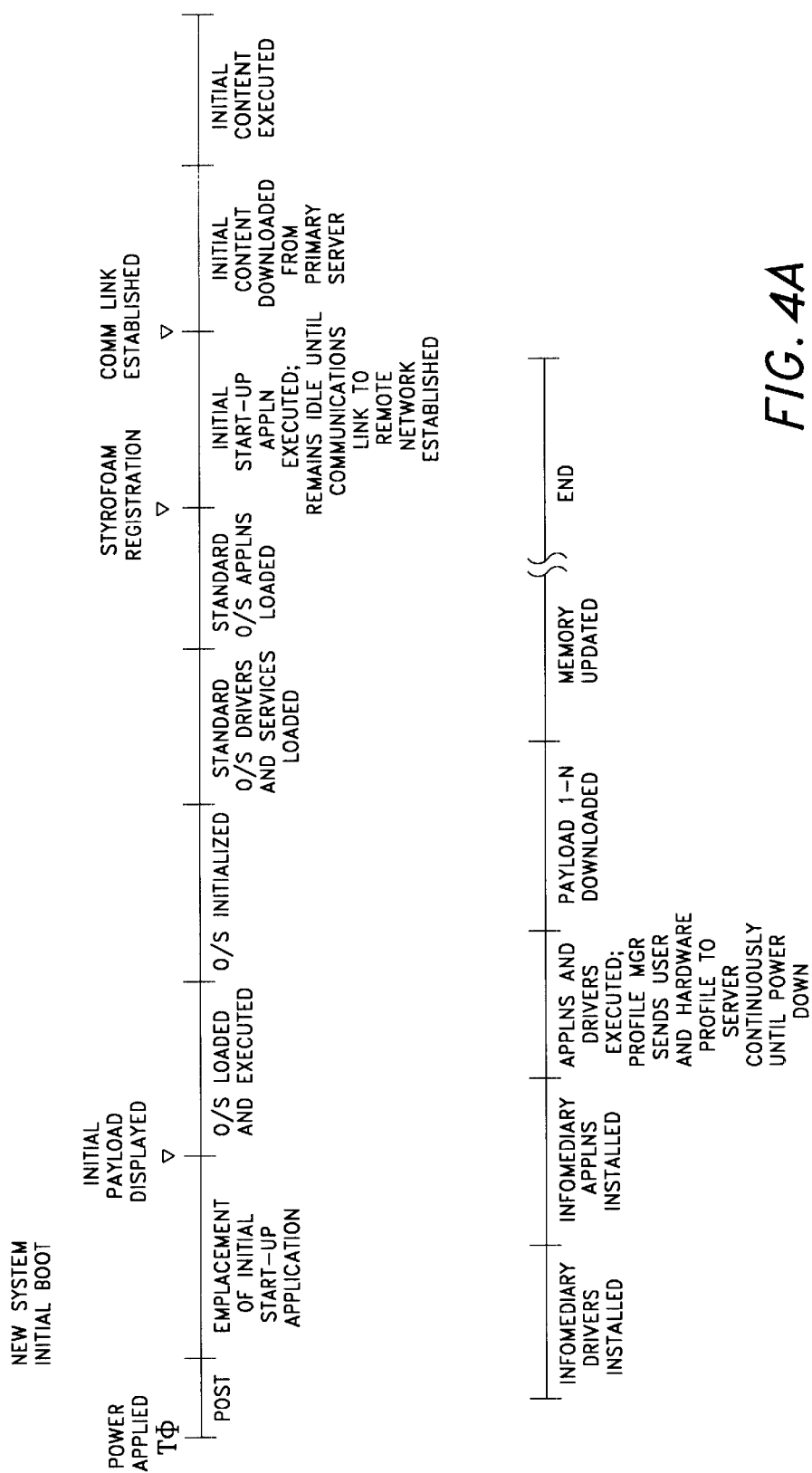
FIG. 4 illustrates one embodiment of a process flow chart provided in accordance with the principles of the invention.
Figure 4B:
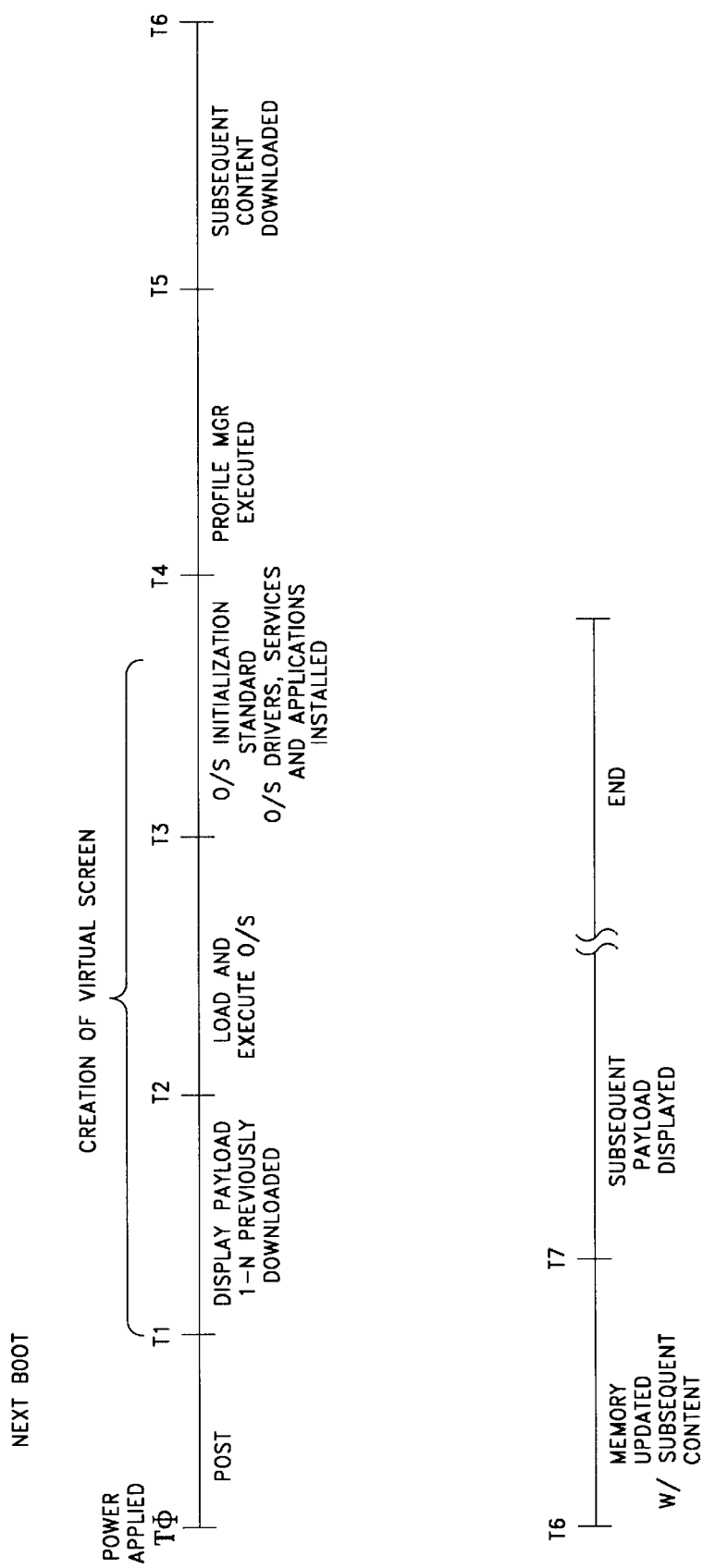

In one embodiment, as shown in FIGS. 3 and 4A and 4B, after power is initially turned on to a new computer system 100, the system commences with POST procedures. During the initial POST, the ISUA 86 is transferred to the mass storage device 152, as shown by A1. In one embodiment, such a transfer is made during the manufacturing and/or assembly process, when the system 100 is first powered up after the operating system has been installed (but prior to loading and running the operating system). In an alternative embodiment, such a transfer may be made after the manufacturing and/or assembly process, after the user receives and powers up the system 100. In a further alternate embodiment, during the transfer of the ISUA 86, additional programs, applications, drivers, data, graphics and other information may also be transferred (for example, from ROM) to the mass storage device 152. For example, the transfer may include the transfer of the initial payload 88*a* to the mass storage device 152, subsequent to which the initial payload is delivered from the mass storage device 152. Alternatively, the initial payload may be delivered from the ROM. One embodiment of the system and process for facilitating such a transfer is described in co-pending U.S. patent application Ser. No. 09/336,067, entitled "System and Method for Transferring an Application Program from System Firmware to a Storage Device" filed on Jun. 18, 1999, which is assigned to Phoenix Technologies, Ltd., the contents of which are incorporated herein by reference. Alternative embodiments of the system and process for facilitating such a transfer are described in co-pending U.S. patent application Ser. No. 09/272,859, entitled "Method and Apparatus for Providing Memory-based Device Emulation" filed on Mar. 19, 1999, in co-pending U.S. Patent Continuation-in-Part application Ser. No. 09/336,307, entitled "Method and Apparatus for Providing Memory-Based Device Emulation" filed on Jun. 18, 1999, and in co-pending U.S. patent application Ser. No. 09/336,281, entitled "System and Method for Inserting One or More Files Onto Mass Storage" filed Jun. 18, 1999, each of which is assigned to Phoenix Technologies, Ltd., the assignee of the present invention, the contents of each of which are incorporated herein by reference.

In one embodiment, the ISUA 86 is a computer software executable program that will determine if there are preinstalled programs that are resident on the end user's system. If so, it will identify those preinstalled programs and create shortcuts (on the desktop in the case of a Windows operating system), or bookmarks, to allow the user to automatically launch the programs. In this embodiment, the executable program is also capable of initiating and establishing two-way communications with one or more applications on the server 22 and/or any one of the service computers 26 (FIG. 1), as described below. Moreover, in one embodiment, graphical content of the initial payload 88*a* is displayed by display engine 94 on the user's display screen 148 during POST. Alternatively, the graphical content of the initial payload 88*a* may be displayed after a subsequent booting process. For example, as part of the user's profile as described below, the user may be asked if he or she would like to obtain additional information regarding one or more products and/or services. If the user so desires, content regarding the desired products and/or services will be displayed during subsequent boot processes.

Once POST is completed, the OS is loaded, executed, and initialized. Standard OS drivers and services are then loaded. The user is then prompted to enter registration information including demographic information such as age, gender, hobbies, etc. In addition, the ISUA 86 is executed, and runs in the background, remaining idle until it detects a communication link established between the computer system 100 and a remote server (e.g., server 22 of FIG. 1) over Network 164 of FIG. 2 (e.g., over the Internet). In one embodiment, the ISUA 86 may search through the operating system to determine if there are applications that have been pre-loaded and pre-installed onto the system. If so, the ISUA 86 may automatically provide short cuts and/or bookmarks for the applications to launch into a predetermined server once the communication link is established. This communication link can be established with a network protocol stack, (e.g. TCP/IP) through sockets, or any other two-way communications technique known in the art. Once the communication link 30 is established, the ISUA 86 issues a request signal to the server 22 (as shown by A2) to download an initial content package 62 from a content module 60. Responsive to the request, the server downloads the initial content package 62 (as shown by A3), which, in one embodiment, is stored in the mass storage device 152. In one embodiment, the initial content 62 and subsequent content 64 may be developed separately, and each is encrypted and/or digitally signed using encryption keys, prior to storing of the initial content 62 and subsequent content 64 on the server 22. When the initial content 62 and/or subsequent content 64 is/are subsequently downloaded into system 100, the crypto engine 92 will use keys 90 to decrypt the initial content 62 and/or subsequent content 64.

As discussed earlier, the initial content package 62 may include applications 62*a*, drivers 62*b*, and payloads 62*c*. In one embodiment, the applications 62*a* include a data loader application and a profile manager application. The data loader application functions in the same or a similar manner as ISUA 86, and once downloaded, disables and replaces the ISUA 86. More specifically, the data loader application is a computer software program which is also capable of initiating, establishing, and terminating two-way communications between the server 22 and the computer system 100. The data loader application also provides traffic control management between the server 22 and computer system 100, as well as other functions to facilitate communication between the end user's system and the designated server, and content downloading to the end user's system.

The profile manager obtains the user and system profiles of the computer system 100 based on user preferences, system hardware, and software installed at the computer system 100. Upon obtaining the user and system profile of the computer system 100, the profile manager application forwards the results to the data loader application, which subsequently provides the information to the server 22, which matches the user indicted preferences with database 24 (FIG. 1). The results may be forwarded at predetermined intervals or at the user's request. The server 22 then processes the user profile or demographic data and targets content to the users that have similar profiles. In addition, the user profile data of a plurality of users are compiled on the server 22 and aggregated to create an aggregate user profile model. Content is then transmitted to user computer system's based on the user profile data and/or the aggregate user profile model (as shown by A4). The subsequent content 64 is downloaded and stored in system firmware 176, designated by numeral 88*b*. In one embodiment, the subsequent content 64 is stored in non-volatile memory such as flash or EEPROM, with the loading of the subsequent content being done by reflashing the ROM, as is well known by those skilled in the art. The subsequent content 64 may also be stored as one or more files on mass storage device 152 or may be used to modify the Windows™ system file (under the Windows™ environment). The profile collection process is continued as long as the computer system 100 is activated. In one embodiment, content may be downloaded after the user's profile is received and analyzed at the server 22.

When the computer system 100 is subsequently powered up (see FIG. 4B), the system again performs POST. The content that was previously downloaded and stored in system firmware 176, and subject to copyright issues being resolved, is then displayed, prior to loading and/or execution of the operating system. In the Windows™ environment, the Windows™ logo, which is displayed during the initial loading of the operating system, is subsequently replaced by one or more screen that display the previously downloaded content stored in system firmware 176.

In the case of storing the content as one or more files on the mass storage device 152, as opposed to reflashing the ROM, the Windows™ logo file, which is displayed during boot-up and shutdown, may be altered or replaced. One embodiment utilizing this approach involves replacing the corresponding Windows™ system files with the one or more files showing the content (e.g., a graphic file), as described in co-pending U.S. patent application Ser. No. 09/336,003, entitled "Displaying Images during Boot-up and Shut-down" filed on Jun. 18, 1999, which is assigned to Phoenix Technologies, LTD., the contents of which are incorporated herein by reference. The boot-up Windows display file is named LOGO.SYS and is usually located in the Windows directory. First the Windows™ LOGO.SYS file is transferred from the Windows directory to another directory. Then, the content graphics file is renamed as LOGO.SYS and is transferred to the Windows™ directory. The operating system retrieves this file when the operating system is first launched, and hence the content is displayed on the display screen. Windows™ expects the LOGO.SYS file to be a bit-mapped file with resolution 320×400 and 256 colors although Windows™ will later stretch the resolution to 640×400 for displaying purposes. Therefore, the content graphics file is to be the same graphics format (usually named with the extension". BMP" before being renamed to LOGO.SYS).

The operating system is then loaded, executed, and initialized. The standard operating system drivers and applications are also loaded. The profile manager is then executed. When a link has been established with the predetermined web site, additional content may be downloaded and subsequently displayed. Such additional content are either provided arbitrarily or provided based on the information obtained from a survey of the user or the user's system. In one embodiment, once the boot process is completed, a portion of the display screen may be used to provide icons or shortcuts that are used to access detailed information regarding the previously displayed messages or advertisements. In a further embodiment, the messages or advertisements may again be displayed during the shut-down process, for example, replacing the screen display that displays the message "Windows is shutting down" or "It is now safe to turn off your computer" with other selected content.

Figure 5:
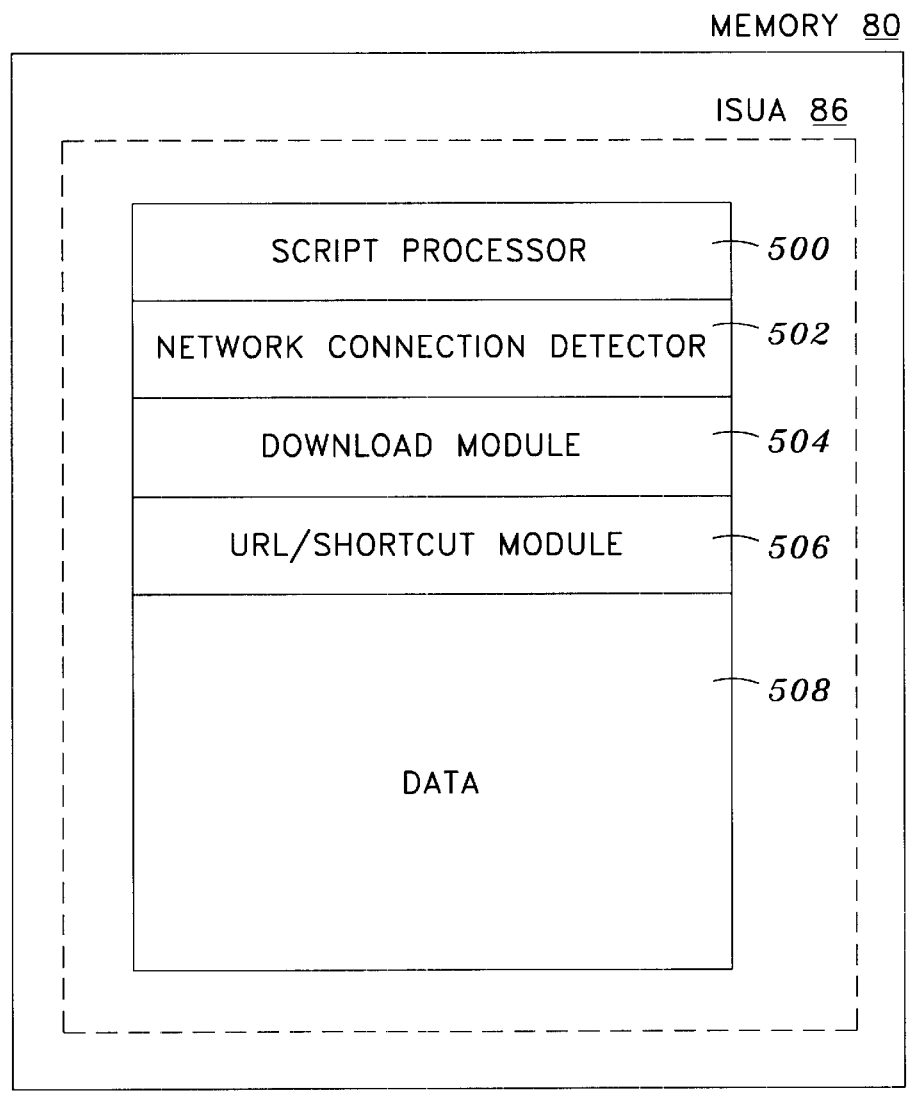
FIG. 5 illustrates a block diagram of one embodiment of an initial start-up application configured in accordance with the principles of the invention.

FIG. 5 is a block diagram illustrating one embodiment of the ISUA 86. ISUA 86 contains a script processor module 500, a network connection detector 501, a download module 504, URL/shortcut module 506, and a data module 508. As shown in FIG. 3, the IUSA 86 is contained in BIOS 176 o the user computer.

Script processor module 500 is the processing element of the ISUA 86. In one embodiment, the script processor module 500 reads a set of op-codes, or command codes from the data area 508, and executes them.

Some of the features supported by the Script Processor are:

Installation of shortcuts on the Windows Desktop;
Installation of shortcuts to web sites;

Download of Internet clients/applications

Download of promotions, free applications;

Execution of pre-loaded Windows applications/installs; and,

Execution of custom payloads.

Execution of custom payloads is a special feature of the ISUA 86. It allows a manufacturer or user of the ISUA 86 to embed another image inside the ISUA 86, or in the system BIOS, where the ISUA 86 will extract and load it. The actions performed by this code are up to the manufacturer.

The network connection detector 502 is a module included in the ISUA 86. It runs in the background and checks for an Internet connection or an appropriate network connection. Once a connection has been detected, the ISUA 86 can invoke the download module 504 to get additional content, applications or promotions from the World Wide Web.

The download module 504 is a component included in the ISUA 86 that allows additional data to be transferred from the Internet to the mass storage device 152 (e.g., the user's hard disk). The download module 504 reads information in the data area 508 to obtain IP addressing and filename information.

The URL/shortcut module 506 allows the ISUA 86 to change the end-user's Windows experience without going to the Internet. The URL/shortcut module 506 processes information in the data area 508 to determine how to configure the Windows Desktop and installed Internet browser. In one embodiment, the functions supported by the URL/Shortcut Module 506 are:

Placement of Internet Shortcuts on the Windows Desktop;

Search of the mass storage device 152 (e.g., the user's hard disk) for pre-installed software and execution of it, or placement of a local shortcut on the desktop to it; and, Change of the Internet browser's Home Page.

Separation of the data area 508 of the ISUA 86 is important because it allows for remote flashing of the data area 508 without the need to re-flash the code area. This allows for changes to the behavior of the ISUA 86 without compromising the integrity of the supporting code. In addition, to provide the most flexible architecture, and the ability to easily update specific components of the ISUA 86, the different modules are encapsulated so that each module in addition to the data area 508 may be updated independently.

Figure 6:
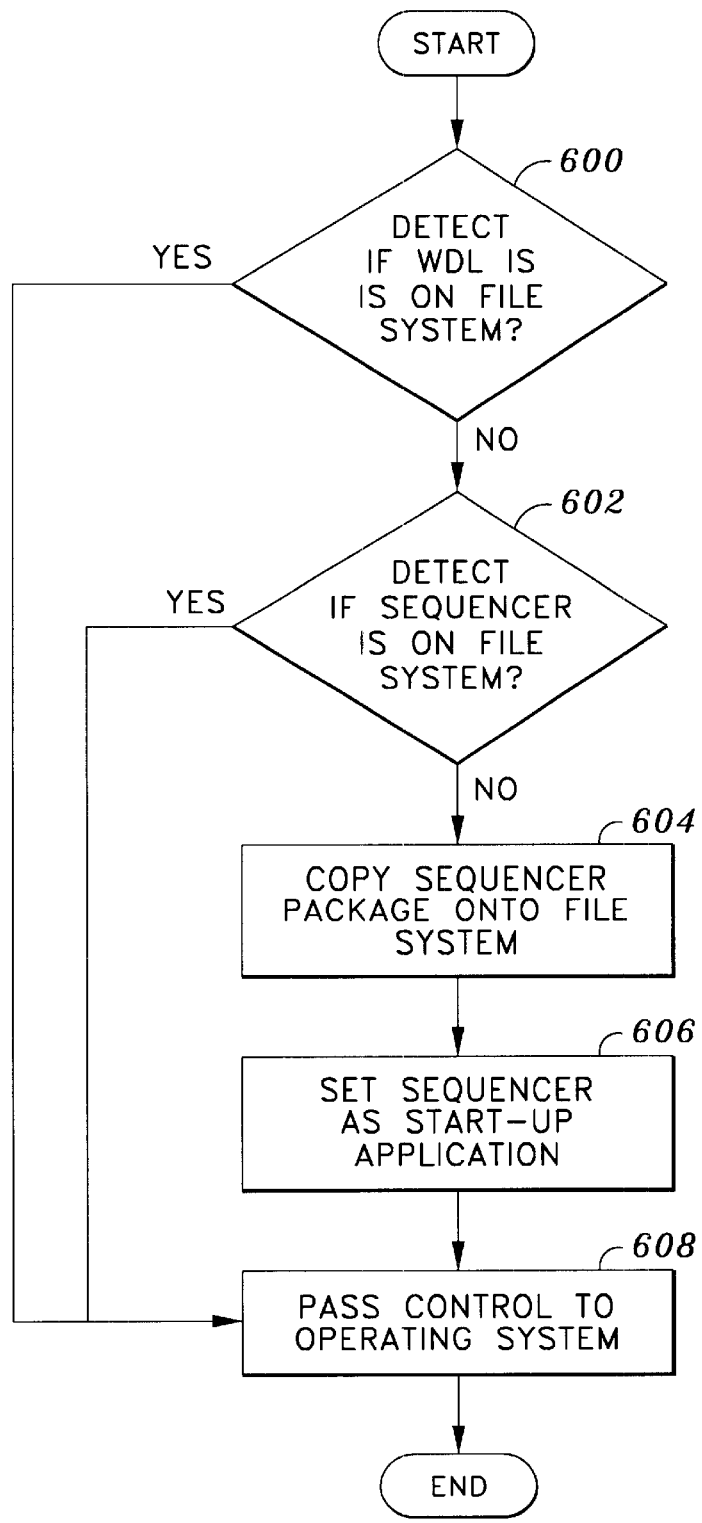
FIG. 6 illustrates a flow diagram detailing one example of a loading operation of the initial start-up application performed in accordance with the principles of the invention.

FIG. 6 is a flow diagram of the operation of BIOS 176 in transferring the ISUA 86 (e.g., "the Sequencer") upon power-up of the computer system 100.

In block 600, it is determined if a data loader application (WDL) 62a is located on the mass storage device 152. As discussed above, WDL 62a is part of the initial content package 62 that is downloaded if the ISUA 86 has been executed before successfully. The presence of WDL 62a may be determined by such operations as querying the file system of mass storage device 152 to see if any or all components of the WDL 62a is present on the file system. Alternatively, the WDL 62a may be determined to be present through the setting of a flag or a special bit in BIOS 176 or mass storage device 152. If the WDL 62a has not been detected on the file system, then operation will continue with block 602.

In block 602, it will be determined if ISUA 86 (shown as the "Sequencer") is in mass storage device 152. Again, the detection of the presence of the ISUA 86 may be performed in a similar fashion as in the detection of the WDL 62a. If the ISUA 86 is detected, then operation will continue with block 608. If the ISUA 86 has not been detected, operation will continue with block 604.

In block 604, the ISUA 86 package is copies onto mass storage device 152. In one embodiment, the ISUA 86 package is initially compressed and is decompressed as it is being transferred into mass storage device 152. In alternate embodiments, the ISUA 86 is transferred directly and optionally decompressed at a later time. The ISUA 86 package may also be encrypted such that a decryption machine needs to be present in order to decrypt the ISUA 86 package. After the ISUA 86 package has been transferred to mass storage device 152, operation will continue with block 606.

In block 606, the ISUA 86 is set to be a start-up application. Thus, the ISUA 86 will be called after the operating system contained on the user system 40 has completed booting. Operation then continues with block 608.

In block 608, control will be returned to the operating system to continue boot-up and initialization of the computer as normal.

Figure 7:
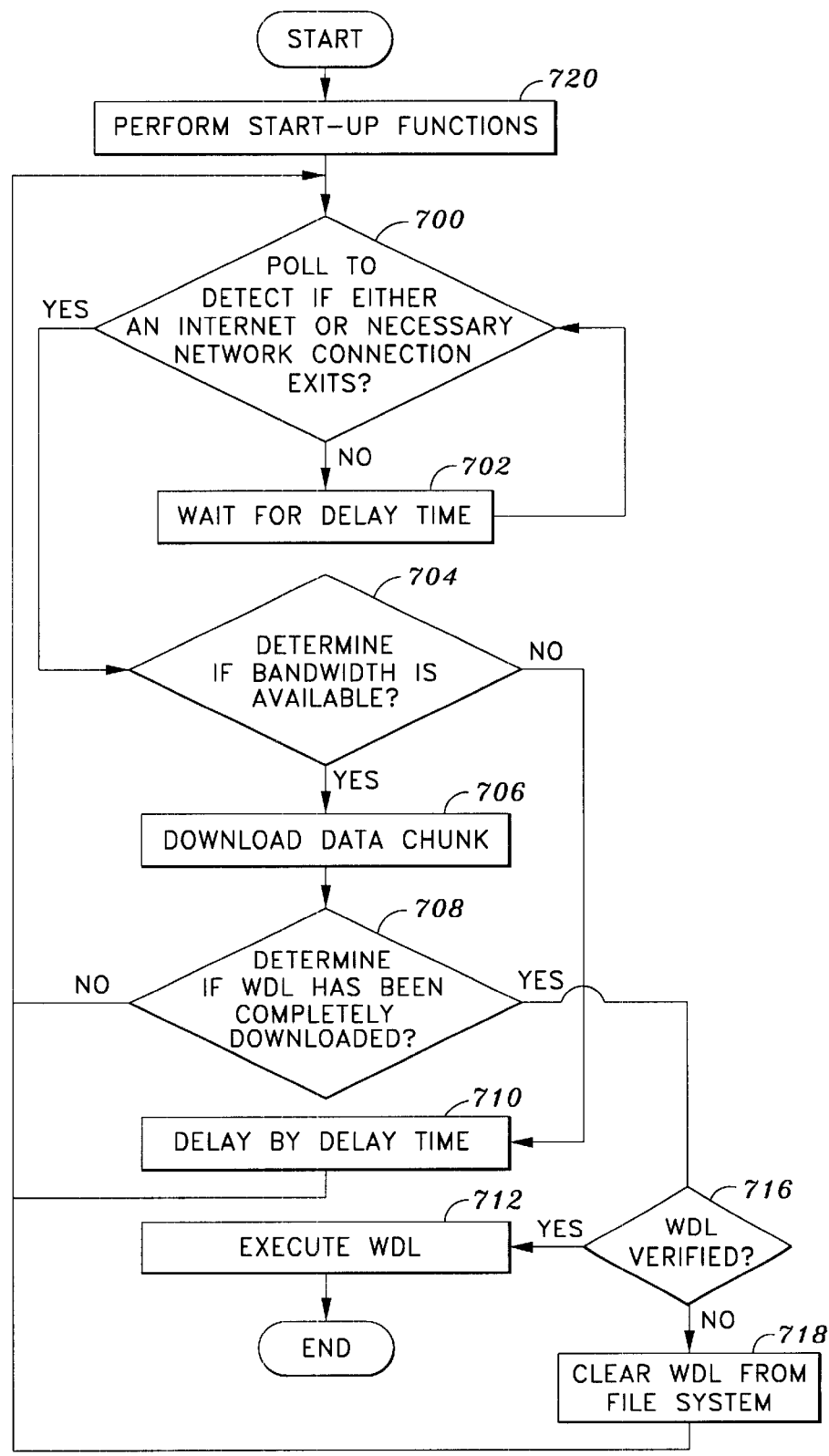
FIG. 7 illustrates a flow diagram detailing one example of the operations of the initial start-up application performed in accordance with the principles of the invention.

FIG. 7 is a flow diagram of one embodiment of the ISUA 86 after the operating system has been loaded and the ISUA 86 has been loaded.

In block 700, the network connection detector 502 of ISUA 86 performs a poll to detect if an Internet or necessary network connection exists. The network connection detector 502 may determine if a necessary network connection exists by querying the operating system or by pinging the primary server that contains the initial content package 62 to see if the primary server is available. In alternate embodiments, network connection detector 502 may attempt to contact a list of servers until one of the servers responds. If a network connection exists, then operation will continue with block 702. Otherwise, operation will continue with block 704.

In block 702, if network connection detector 502 does not detect a network connection, it will wait for a delay time and then return to block 700. In one embodiment, the delay is 10 seconds.

If, in block 700, the network connection detector 502 has detected a necessary network connection exists, then in block 704, network connection detector 502 checks to see how much bandwidth the user is using. This is to determine if there is sufficient bandwidth available to the ISUA 86 for transferring information without noticeably affecting the user's use of the bandwidth.

Preferably, the user would not be aware that there is bandwidth use by the ISUA 86. In one embodiment, the network connection detector 502 may use heuristics in analyzing the bandwidth that is being used and the time that it has been in use to determine if it is appropriate for the ISUA 86 to use the connection. For example, the network connection detector 502 may wait until the user has only used less than 50% of the bandwidth for five minute before the ISUA 86 begins to use the connection. In another embodiment, a predetermined threshold may be used to determine if bandwidth is available for use by ISUA 86. Thus, for example, if the amount of connection bandwidth that is being consumed by other processes is only 10% of the total bandwidth, then there is deemed to be sufficient bandwidth available for use by the ISUA 86. The amount of bandwidth that is used by the ISUA 86 may be based on a simple ratio or some mathematical relationship between the bandwidth used by the user or the bandwidth that is to be used by the ISUA 86. If the bandwidth is available for use, then operation will continue with block 706. Otherwise, operation will continue with block 710.

In block 706, the download module 504 of the ISUA 86 will download a data chunk of the WDL 62a in one transfer instead of performing separate downloads of each portion of data of the WDL 62a.

In block 708, the download module 504 will determine if the WDL 62a has been completely downloaded. If the WDL 62a has been completely downloaded, then operation will continue with block 716. Otherwise, operation will return to block 700.

In block 716, once download module 504 has determined that the WDL 62a has been completely downloaded, download module 504 will verify the completeness and integrity of WDL 62a. For example, download module 504 may perform a checksum operation on the downloaded WDL 62a to determine if an error was encountered during downloading. If the WDL 62a is verified, then operation will continue with block 712. Otherwise, operation will continue with block 718.

In block 712, once the WDL 62a has been verified, then URL/shortcut module 506 install shortcuts to any applications such as set-up/sign-up programs for Internet service providers or links to web sites. In addition, once the WDL 62a has been verified, WDL 62a will be executed by the operating system as a start-up application. After URL/shortcut module 506 has altered the shortcut, operation then ends.

In block 718, if the WDL 62a has not been verified in block 716, then the download module 304 will remove the WDL 62a from mass storage device 152. Operation then continues with block 700, where the network connection detector 502. again polls to detect if a necessary network connection exists.

Although the present invention has been described in terms of certain preferred embodiments, other embodiments apparent to those of ordinary skill in the art are also within the scope of this invention. Accordingly, the scope of the invention is intended to be defined only by the claims that follow.

What is claimed is:

1. A method comprising:
   copying a first application from a first non-volatile memory to a second non-volatile memory;
   setting the first application to be a start-up application;
   booting-up an operating system;
   executing the first application;
   determining if a suitable connection exists;
   determining if a needed bandwidth of the suitable connection is available;
   downloading a second application if the suitable connection exists and the needed bandwidth of the suitable connection is available; and,
   executing the second application.

2. The method of claim 1, where the first non-volatile memory contains a BIOS.

3. The method of claim 1, where the second non-volatile memory is a mass storage device.

4. The method of claim 1, where setting the first application to be a start-up application comprises:
   creating a short-cut to the first application; and,
   placing the short-cut to the first application in a predetermined location.

5. The method of claim 1, where determining if the suitable connection exists comprises determining if communications may be achieved with a server.

6. The method of claim 1, where determining if the suitable connection exists comprises determining if a network connection exists.

7. The method of claim 1, where determining if the needed bandwidth of the suitable connection is available comprises:
   determining a ratio between how much of a bandwidth of the suitable connection is being consumed compared to the bandwidth as a whole; and,
   comparing the ratio with a first threshold.

8. The method of claim 7, further comprising:
   determining a time period where the ratio is below the first threshold; and,
   comparing the time period with a second threshold.

9. The method of claim 1, further comprising determining if the second application has been downloaded successfully.

10. The method of claim 9, where determining if the second application has been downloaded successfully comprises performing an integrity check on the second application.

11. The method of claim 9, where determining if the second application has been downloaded successfully comprises determining if the second application has been downloaded completely.

12. An article comprising a computer readable medium having instructions stored thereon, which when executed, causes:
   copying of a first application from a first non-volatile memory to a second non-volatile memory;
   setting of the first application to be a start-up application;
   boot-up of an operating system;
   execution of the first application;
   determining if a suitable connection exists;
   determining if a needed bandwidth of the suitable connection is available;
   downloading of a second application if the suitable connection exists and the needed bandwidth of the suitable connection is available; and,
   execution of the second application.

13. The article of claim 12, where the first non-volatile memory contains a BIOS.

14. The article of claim 12, where the second non-volatile memory is a mass storage device.

15. The article of claim 12, where setting the first application to be a start-up application comprises:
   creating a short-cut to the first application; and,
   placing the short-cut to the first application in a predetermined location.

16. The article of claim 12, where determining if the suitable connection exists comprises determining if communications may be achieved with a server.

17. The article of claim 12, where determining if the suitable connection exists comprises determining if a network connection exists.

18. The article of claim 12, where determining if the needed bandwidth of the suitable connection is available comprises:
   determination of a ratio between how much of a bandwidth of the suitable connection is being consumed compared to the bandwidth as a whole; and,
   comparing the ratio with a first threshold.

19. The article of claim 18, further comprising:
   determination of a time period where the ratio is below the first threshold; and,
   comparing the time period with a second threshold.

20. The article of claim 12, further comprising determining if the second application has been downloaded successfully.

21. The article of claim 20, where determining if the second application has been downloaded successfully comprises performing an integrity check on the second application.

22. The article of claim 20, where determining if the second application has been downloaded successfully comprises determining if the second application has been downloaded completely.

23. An apparatus comprising:

means for copying a first application from a first non-volatile memory to a second non-volatile memory;

means for setting the first application to be a start-up application;

means for booting-up an operating system;

means for executing the first application;

means for determining if a suitable connection exists;

means for determining if a needed bandwidth of the suitable connection is available;

means for downloading a second application if the suitable connection exists and the needed bandwidth of the suitable connection is available; and, means for executing the second application.

24. The apparatus of claim 23, where the first non-volatile memory contains a BIOS.

25. The apparatus of claim 23, where the second non-volatile memory is a mass storage device.

26. The apparatus of claim 23, where the means for setting the first application to be a start-up application comprises:

means for creating a short-cut to the first application; and, means for placing the short-cut to the first application in a predetermined location.

27. The apparatus of claim 23, where the means for determining if the suitable connection exists comprises means for determining if communications may be achieved with a server.

28. The apparatus of claim 23, where the means for determining if the suitable connection exists comprises means for determining if an Internet connection exists.

29. The apparatus of claim 23, where the means for determining if the needed bandwidth of the suitable connection is available comprises:

means for determining a ratio between how much of a bandwidth of the suitable connection is being consumed compared to the bandwidth as a whole; and, means for comparing the ratio with a first threshold.

30. The apparatus of claim 29, further comprising:

means for determining a time period where the ratio is below the first threshold; and, means for comparing the time period with a second threshold.

31. The apparatus of claim 23, further comprising means for determining if the second application has been downloaded successfully.

32. The apparatus of claim 31, where the means for determining if the second application has been downloaded successfully comprises means for performing an integrity check on the second application.

33. The apparatus of claim 31, where the means for determining if the second application has been downloaded successfully comprises means for determining if the second application has been downloaded completely.

* * * * *